United States Patent
Leparoux et al.

(10) Patent No.: US 11,846,420 B2
(45) Date of Patent: Dec. 19, 2023

(54) COMBUSTION CHAMBER COMPRISING MEANS FOR COOLING AN ANNULAR CASING ZONE DOWNSTREAM OF A CHIMNEY

(71) Applicant: SAFRAN AIRCRAFT ENGINES, Paris (FR)

(72) Inventors: Julien Marc Matthieu Leparoux, Moissy-Cramayel (FR); Christophe Pieussergues, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/610,288

(22) PCT Filed: May 12, 2020

(86) PCT No.: PCT/EP2020/063202
§ 371 (c)(1),
(2) Date: Nov. 10, 2021

(87) PCT Pub. No.: WO2020/229476
PCT Pub. Date: Nov. 19, 2020

(65) Prior Publication Data
US 2022/0235936 A1    Jul. 28, 2022

(30) Foreign Application Priority Data
May 13, 2019 (FR) ..................................... 1904934

(51) Int. Cl.
*F23R 3/06* (2006.01)
*F23R 3/00* (2006.01)
(Continued)

(52) U.S. Cl.
CPC ................ *F23R 3/06* (2013.01); *F23R 3/002* (2013.01); *F23R 3/50* (2013.01); *F02C 7/266* (2013.01); *F23R 2900/03042* (2013.01)

(58) Field of Classification Search
CPC .. F02C 7/264; F02C 7/266; F23R 3/06; F23R 3/002; F23R 3/50; F23R 3/60; F23R 2900/03042; F23R 2900/00012
See application file for complete search history.

(56) References Cited

U.S. PATENT DOCUMENTS 3,184,918 A    5/1965    Mulcahey
4,622,821 A  * 11/1986   Madden .................. F23R 3/002
                                            60/757
(Continued)

FOREIGN PATENT DOCUMENTS

FR          1.398.352        5/1965
WO    WO 2015/049468 A1     4/2015
WO    WO 2018/050999 A1     3/2018

OTHER PUBLICATIONS

International Search Report dated Jun. 26, 2020 in PCT/EP2020/063202 filed on May 12, 2020, 2 pages.
(Continued)

*Primary Examiner* — Arun Goyal
*Assistant Examiner* — Henry Ng
(74) *Attorney, Agent, or Firm* — Oblon, McClelland, Maier & Neustadt, L.L.P.

(57) ABSTRACT

A combustion chamber for a turbomachine including an annular casing delimiting an inner volume of the combustion chamber and provided with a chimney extending to the outside of the inner volume and delimiting a passage for a penetrating part, and a bushing mounted floating on the chimney, further includes: a main air collection chamber open to the upstream arranged facing the downstream portion of the chimney; and a through-opening of the annular
(Continued)

casing, connecting the inner volume to the main air collection chamber. The air collected by the main air collection chamber is injected into the inner volume via the through-opening and can cool an annular casing zone downstream of the chimney.

13 Claims, 5 Drawing Sheets

(51) Int. Cl.
  *F23R 3/50* (2006.01)
  *F02C 7/266* (2006.01)
  *F23R 3/60* (2006.01)

(56) References Cited

U.S. PATENT DOCUMENTS

| | | | |
|---|---|---|---|
| 8,505,311 B2 | 8/2013 | Deschamps et al. | |
| 9,249,978 B2* | 2/2016 | Richardson | F23R 3/60 |
| 10,233,836 B2 | 3/2019 | Leglaye et al. | |
| 10,371,384 B2 | 8/2019 | Yoama Miry et al. | |
| 10,883,718 B2 | 1/2021 | Lunel et al. | |
| 11,009,231 B2 | 5/2021 | Leparoux et al. | |
| 2002/0170293 A1 | 11/2002 | Farmer et al. | |
| 2004/0104538 A1* | 6/2004 | Pidcock | F23R 3/04 |
| | | | 277/549 |
| 2007/0051110 A1 | 3/2007 | Holland et al. | |
| 2009/0064657 A1* | 3/2009 | Zupanc | F02C 7/264 |
| | | | 60/39.821 |
| 2010/0212324 A1* | 8/2010 | Bronson | F23R 3/06 |
| | | | 60/39.821 |
| 2011/0120132 A1 | 5/2011 | Rudrapatna et al. | |
| 2012/0255275 A1* | 10/2012 | Bunel | F23R 3/50 |
| | | | 60/39.827 |
| 2014/0137568 A1* | 5/2014 | Bunel | F02C 7/20 |
| | | | 60/796 |
| 2014/0144148 A1* | 5/2014 | Jause | F02C 7/24 |
| | | | 60/800 |
| 2016/0237896 A1* | 8/2016 | Leglaye | F02C 3/04 |
| 2017/0167728 A1* | 6/2017 | Gonyou | F23R 3/002 |
| 2017/0292707 A1 | 10/2017 | Tsunoda et al. | |
| 2018/0283689 A1* | 10/2018 | Wang | F23R 3/06 |
| 2019/0101290 A1* | 4/2019 | Burguburu | F02C 7/266 |
| 2019/0353351 A1* | 11/2019 | Bunel | F23R 3/60 |

OTHER PUBLICATIONS

Preliminary French Search Report dated Apr. 8, 2020 in French Patent Application No. 1904934 filed on May 13, 2019 (with translation of category of cited documents), 2 pages.

* cited by examiner

COMBUSTION CHAMBER COMPRISING MEANS FOR COOLING AN ANNULAR CASING ZONE DOWNSTREAM OF A CHIMNEY

TECHNICAL FIELD

The present invention relates to the field of combustion chambers of turbomachines, in particular turbomachines used for the propulsion of aircraft.

The invention relates more particularly to a combustion chamber comprising at least one annular casing delimiting an inner volume of the combustion chamber and provided with a chimney extending to the outside of the inner volume and delimiting a passage for a penetrating part through the annular casing, and, possibly, a bushing mounted floating on the chimney.

PRIOR ART

The internal temperature of combustion chambers is such that it is in general necessary to cool the annular casings that delimit the inner volume of these combustion chambers.

A common solution to limit the heating of such an annular casing consists of circulating a relatively cool film of air along the annular casing, within the inner volume of the combustion chamber.

Such a parietal film of air is in general formed by means of a multitude of microperforations formed in the annular casing, and through which relatively cool air coming from a bypass space of the combustion chamber is introduced into the inner volume of the latter.

However, in the cases where the annular casing is provided with a chimney intended for the passage of a penetrating part, such as a spark plug, through the annular casing, the chimney and the penetrating part degrade the efficiency of the cooling of a zone of the annular casing located immediately downstream of this chimney.

Indeed, the penetrating part constitutes, within the inner volume of the combustion chamber, an obstacle that interrupts the parietal film of air.

In addition, the region of location of the chimney in the annular casing and the passage delimited by the chimney constitute themselves a region devoid of microperforations.

Finally, outside the combustion chamber, the chimney also constitutes an obstacle to the flow of cool air circulating in the bypass space of the combustion chamber and supplying the microperforations. The microperforations possibly located in the wake of the chimney are therefore under-supplied with cooling air.

Document WO2015/049468A1 discloses a chimney of an annular casing of a combustion chamber provided with lateral conduits able to deviate, to a median axial plane of the chimney, air circulating around the chimney in the bypass space of the combustion chamber. This document also discloses a deflector fastened on an outer casing arranged around a combustion chamber, in order to deviate, to the external annular casing of the combustion chamber, air circulating in the bypass space of the combustion chamber.

These solutions are however not optimal regarding the cooling of the zone located immediately downstream of a chimney.

Document WO2018/050999A1 discloses a chimney provided with a deflector arranged opposite microperforations so as to participate in the formation of a parietal cooling film of air.

The supplying with air of these microperforations is however not optimal due to the fact that the chimney masks the microperforations with regards to the flow of air circulating in the bypass space of the combustion chamber.

DISCLOSURE OF THE INVENTION

The invention has in particular for purpose to provide a simple, economical and efficient solution to this problem, making it possible to avoid at least partially the disadvantages described hereinabove.

For this purpose, the combustion chamber further comprises a main air collection chamber open to the upstream and closed to the downstream, arranged facing a downstream portion of the chimney; and at least one through-opening formed in the annular casing and putting into direct communication the inner volume of the combustion chamber and the main air collection chamber.

The main air collection chamber makes it possible to capture air coming from upstream of the chimney and to inject it, via the through-opening, into the inner volume of the combustion chamber, where this air allows for a cooling of the annular casing.

In a preferred embodiment of the invention, the combustion chamber further comprises a deflector arranged in the inner volume of the combustion chamber, connected to a region of the annular casing that is closer to a central axis of the chimney than the through-opening or each through-opening is, and extending facing and beyond the through-opening or each through-opening, whereupon a space of formation of parietal cooling air film, closed to the upstream and open to the downstream, is defined between the annular casing and the deflector.

The deflector makes it possible to deviate the air injected beforehand into the inner volume of the combustion chamber via the through-opening. The deflector thus favours, in combination with the through-opening, the formation of a parietal cooling film of air circulating along the annular casing.

According to other advantageous aspects of the invention, the combustion chamber has one or more of the following characteristics, taken individually or according to any technically permissible combinations:

- the deflector comprises a proximal portion in the form of a portion of a ring through which the deflector is connected to said region of the annular casing, and a free distal portion extending facing and beyond the through-opening or each through-opening;
- the main air collection chamber is in the form of a portion of a ring and has two opposite respective circumferential ends open to the upstream;
- the main air collection chamber is closed on the side opposite the annular casing;
- the combustion chamber furthermore comprises a secondary air collection chamber, open to the upstream and closed to the downstream, arranged facing the downstream portion of the chimney, and the downstream portion of the chimney comprises air passage orifices putting into direct communication the passage and the secondary air collection chamber;
- the secondary air collection chamber is in the form of a portion of a ring and has two opposite respective circumferential ends open to the upstream;
- the secondary air collection chamber is arranged between the chimney and a portion at least of the main air collection chamber;

the annular casing is formed at least by an annular wall provided with an orifice, and an annular flange of an additional part, housed in the orifice of the annular wall; and the additional part further comprises a tubular wall forming the chimney and from which the annular flange extends by moving away from the central axis of the chimney, said annular flange comprising the through-opening or each through-opening; and the additional part further comprises the main air collection chamber;

the additional part further comprises said region of the annular casing to which the deflector is connected, and the deflector;

the additional part further comprises the secondary air collection chamber.

The invention also relates to a turbomachine for an aircraft, comprising a combustion chamber of the type described hereinabove, and a penetrating part extending through the chimney.

In embodiments of the invention, the penetrating part is a spark plug.

BRIEF DESCRIPTION OF THE DRAWINGS

The invention shall be better understood, and other details, advantages and characteristics of the latter will appear when reading the following description given by way of a non-limiting example and in reference to the accompanying drawings wherein.

In all of these figures, identical references can designate identical or similar elements.

DETAILED DISCLOSURE OF PREFERRED EMBODIMENTS

Figure 1:
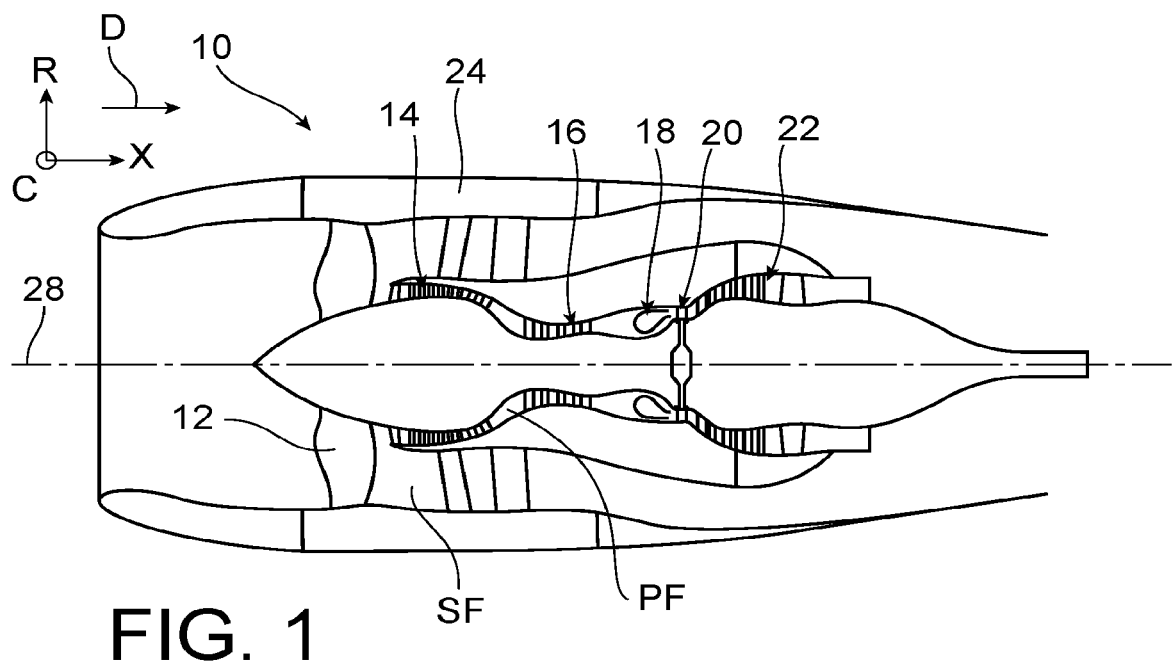
FIG. 1 is a partial schematic view as an axial cross-section of a turbomachine for an aircraft.

The FIG. 1 shows a turbomachine 10 for an aircraft, including in general a fan 12 intended for the aspiration of a flow of air being divided downstream of the fan into a primary flow circulating in a flow channel for primary flow, hereinafter called primary duct PF, within a gas generator, and a secondary flow that bypasses this gas generator in a flow channel for secondary flow, hereinafter called secondary duct SF.

The turbomachine is for example a bypass turbo turbine engine. The gas generator thus includes, generally, a low-pressure compressor 14, a high-pressure compressor 16, a combustion chamber 18, a high-pressure turbine 20 and a low-pressure turbine 22. The respective rotors of the high-pressure compressor and of the high-pressure turbine are connected by a shaft called "high-pressure shaft", while the respective rotors of the low-pressure compressor and of the low-pressure turbine are connected by a shaft called "low-pressure shaft", in a manner known per se. The turbomachine is furthermore shrouded by a nacelle 24. The different rotors are rotatably mounted about a longitudinal axis 28 of the turbomachine.

In all of this description, the axial direction X is the direction of the longitudinal axis 28. Except where it is stipulated otherwise, the radial direction R is at any point a direction orthogonal to the longitudinal axis 28 and passing through the latter, and the circumferential or tangential direction C is at any point a direction orthogonal to the radial direction R and to the longitudinal axis 28. Except where it is stipulated otherwise, the terms "inner" and "outer" refer respectively to a relative proximity, and a relative separation, of an element in relation to the longitudinal axis 28. Finally, the qualifiers "upstream" and "downstream" are defined by reference to the direction D of the flow of the gases in the primary PF and secondary SF ducts of the turbomachine.

Figure 2:
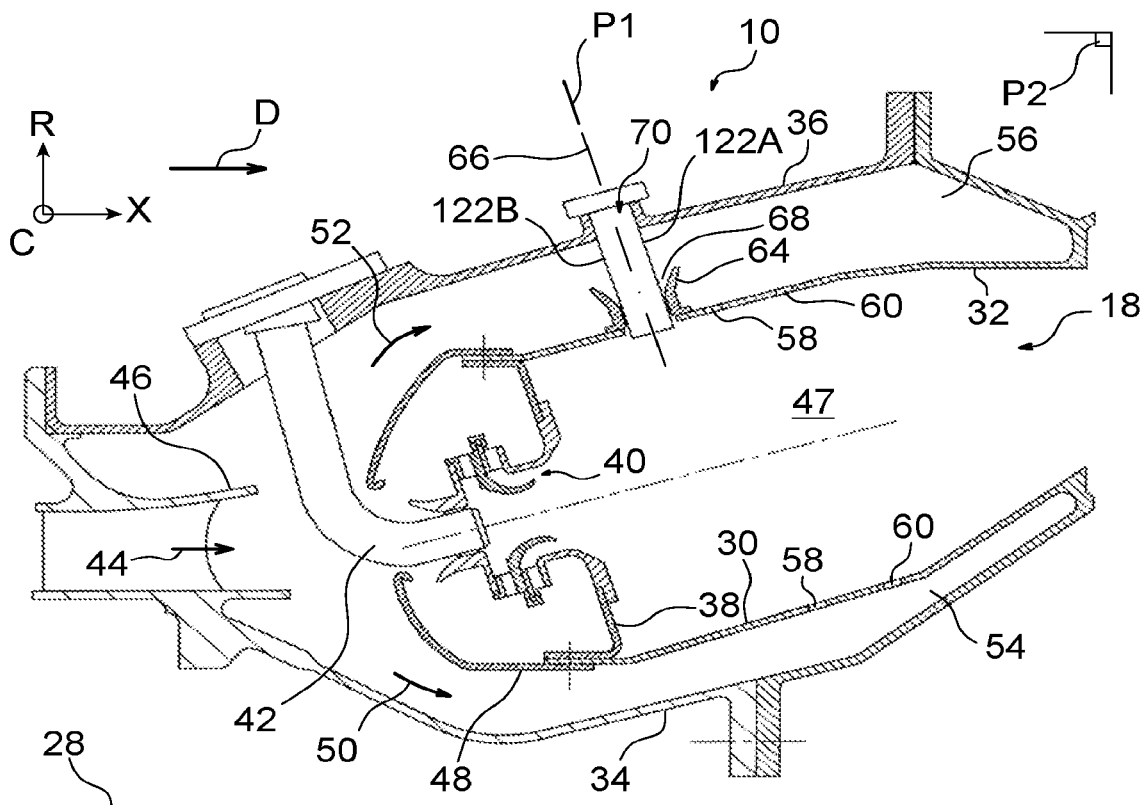
FIG. 2 is a partial schematic half-view as an axial cross-section of a combustion chamber of a turbomachine of a known type.

FIG. 2 shows on a larger scale the combustion chamber 18 and its immediate environment, in a known configuration of the prior art.

The combustion chamber 18 comprises two coaxial annular casings, respectively inner 30 and outer 32, centred with respect to a longitudinal axis of the combustion chamber, that is confounded with the longitudinal axis 28 of the turbomachine.

These two annular casings 30 and 32 are fastened downstream at inner 34 and outer 36 casings of the combustion chamber, and are connected to one another at their upstream end by an annular casing of a chamber bottom 38 wherein injection systems 40 are mounted respectively associated with an annular row of fuel injectors 42. Each injection system 40 comprises openings intended for the injection, in the combustion chamber, of a median portion of a flow of air 44 coming from a diffuser 46 mounted at the outlet of the high-pressure compressor 16 of the turbomachine.

The annular casings 30, 32 and 38 thus delimit an inner volume 47 of the combustion chamber 18.

Moreover, the inner 30 and outer 32 annular casings of the combustion chamber are for example connected at their upstream end to an annular shroud 48 that makes it possible to protect the annular casing of a chamber bottom 38 and the injection systems 40, and that makes it possible to guide downstream a radially internal portion 50 of the flow of air 44, hereinafter called inner bypass flow of air, and a radially external portion 52 of the flow of air 44, hereinafter called outer bypass flow of air, respectively along inner 30 and outer 32 annular casings, within inner 54 and outer 56 bypass spaces. The inner 30 and outer 32 annular casings of the combustion chamber include for example each one of the air inlet orifices 58 and 60 intended for injecting a portion of the inner bypass flow of air 50 and of a portion of the outer bypass flow of air 52 into the ignited gases within the combustion chamber.

Figure 3:
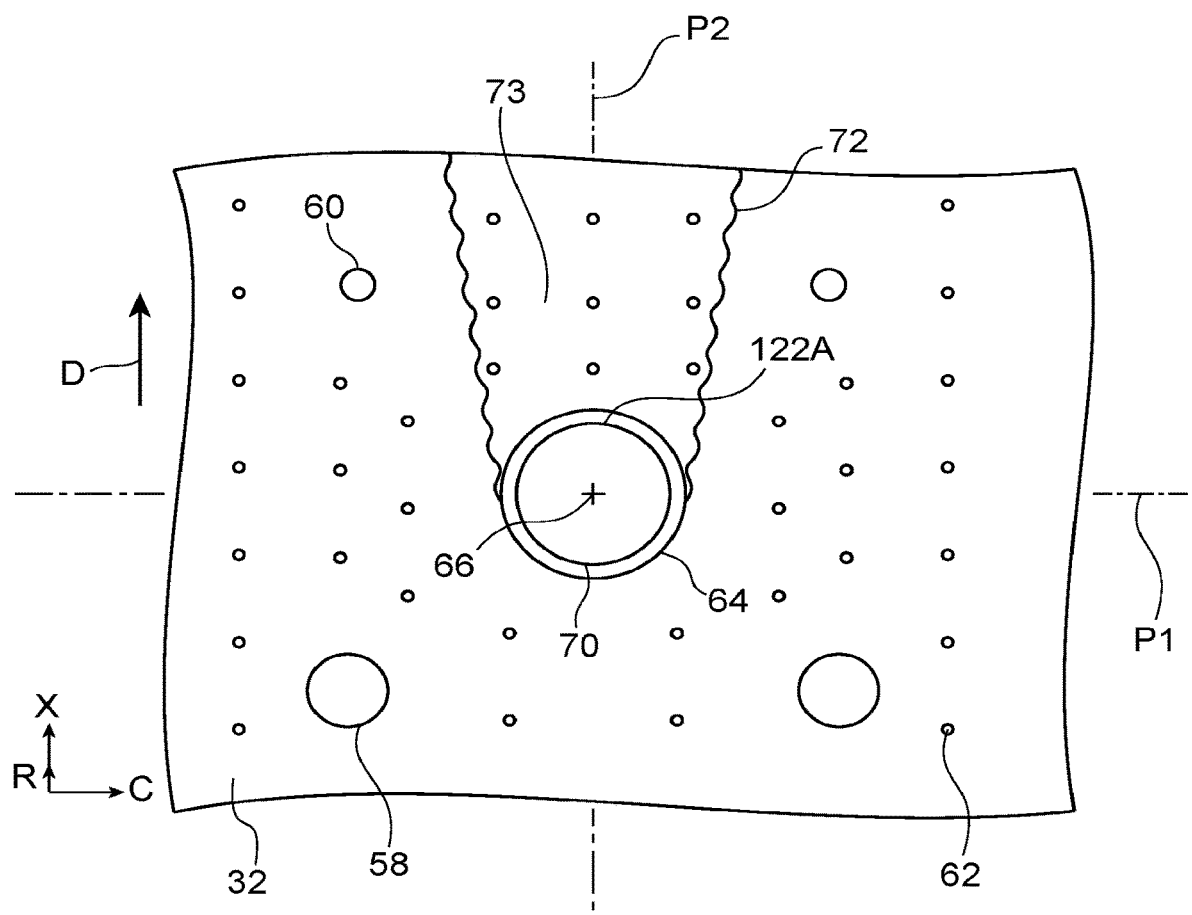
FIG. 3 is a partial schematic view of the top of an external annular casing of the combustion chamber of FIG. 2.

The coaxial annular casings 30 and 32 are furthermore provided with many microperforations, distributed substantially over the entire surface of these walls, and intended to create a parietal cooling film of air along each one of these walls within the combustion chamber 18. These microperforations are not shown in FIG. 2 for reasons of scale, but are shown in FIG. 3, where these microperforations, designated by the reference 62, are shown larger and distributed according to a lesser density than in reality. The microperforations 62 in general have diameters comprised between 0.3 and 0.6 mm approximately, and are, in any case, clearly smaller than the air inlet orifices 58 and 60.

Moreover, at least one of the annular casings 30 and 32 comprises at least one chimney delimiting a passage for a penetrating part, such as a spark plug, through said casing.

For example, the external annular casing 32 thus includes a chimney 64 extending according to a central axis 66 for example locally orthogonal to the annular casing 32, and delimiting a passage 68 opening onto the combustion chamber 18 and through which extends a spark plug 70 mounted on the outer casing 36. Such a spark plug 70 is intended to initiate the combustion of the air and fuel mixture within the combustion chamber 18, at the starting of the turbomachine. In a manner known per se, the seal between the spark plug 70, or a similar through-part, and the chimney 64, is advantageously provided by means of a bushing mounted floating in the chimney.

Generally, the absence of microperforations in the zone corresponding to the chimney 64 and to its periphery penalises the cooling of this zone of the annular casing concerned 32.

Furthermore, the spark plug 70 constitutes, in the inner volume 47 of the combustion chamber, an obstacle of a nature to interrupt a parietal film of air coming from upstream.

In addition, as schematically shown in FIG. 3, the chimney 64 constitutes, outside the combustion chamber, a local obstacle to the flow of the corresponding inner 50 or outer 52 bypass flow of air, generating a wake 72 in this flow of air.

Such a wake 72 tends to reduce the supply with air of microperforations located in the zone 73 of the annular casing 32 located to the right of the wake 72, immediately downstream of the chimney, and therefore prevent good cooling of this zone.

The presence of the chimney 64, and, where applicable, of the spark plug 70, is because of this able to cause, within the annular casing 32, high thermal gradients, of a magnitude of several hundred degrees Celsius, over a very short distance, of a magnitude of a few millimetres. Such thermal gradients generally result in a lessening in the service life of the annular casing 32.

Other types of penetrating parts, such as start-up injectors, can cause similar problems.

The invention, which shall be described in reference to FIGS. 4 to 7, makes it possible to at least partially overcome the problem described hereinabove.

FIGS. 4 to 7 partially show the combustion chamber 18, in a configuration in accordance with a preferred embodiment of the invention.

Figure 4:
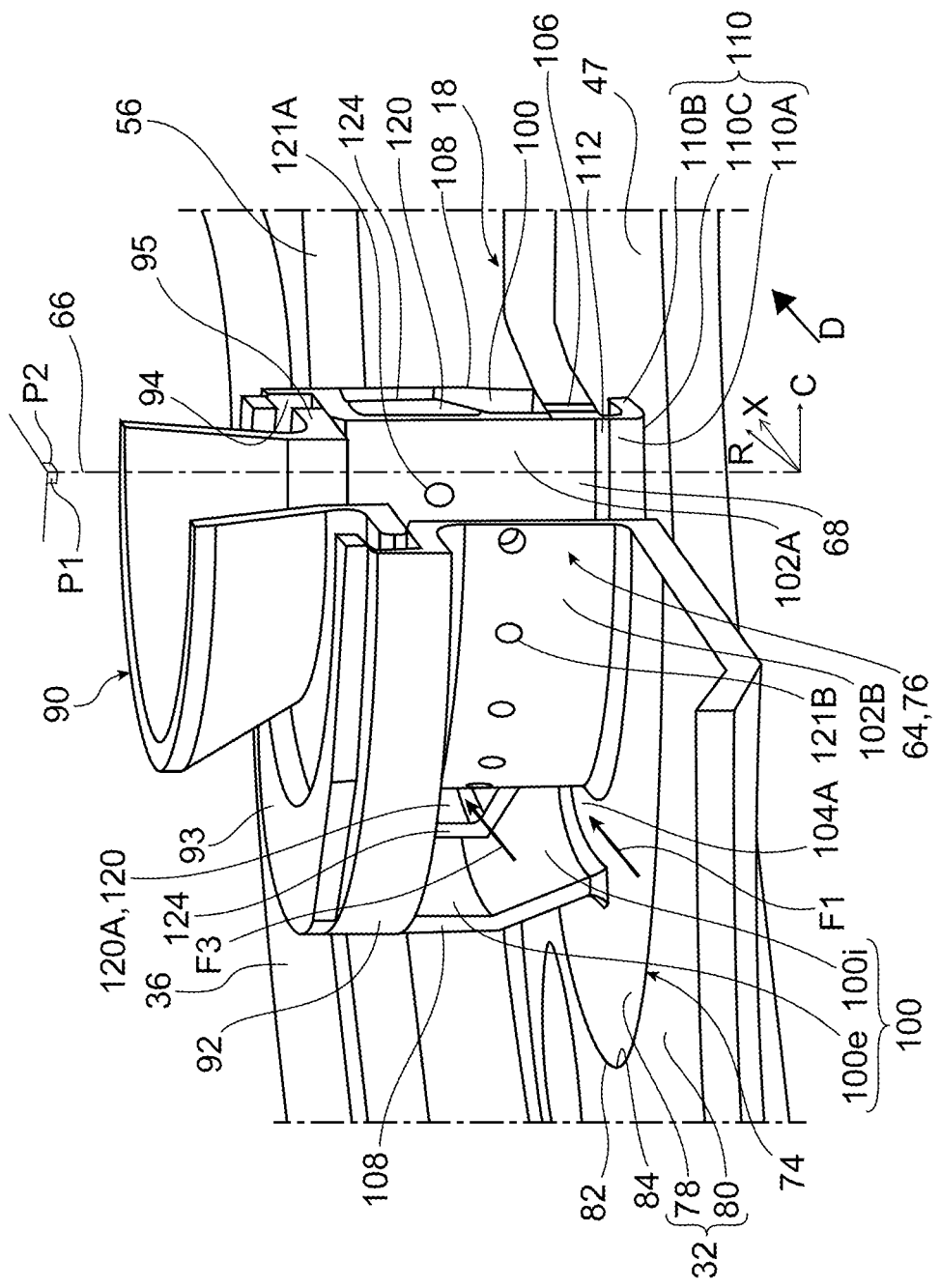
FIG. 4 is a partial schematic view in perspective and as an axial cross-section of a combustion chamber of a turbomachine according to a preferred embodiment of the invention.

FIG. 4 shows in particular the external annular casing 32 provided with the chimney 64 that extends towards the exterior of the combustion chamber 18, from the annular casing 32, by delimiting the passage 68 for the penetrating part (this penetrating part is not visible in the FIGS. 4-7 for increased clarity). The description that follows relates to an example wherein the penetrating part is a spark plug. This description can however be directly transposed to other types of penetrating parts such as those indicated hereinabove.

Figure 5:
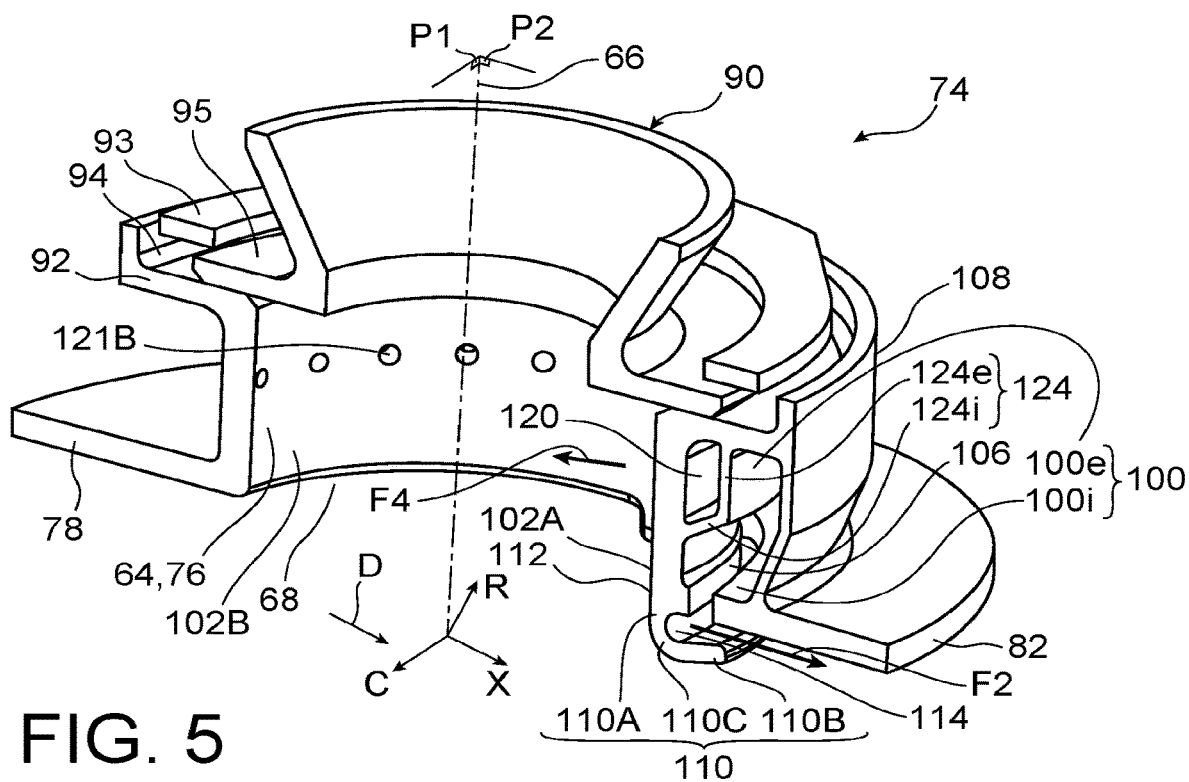
FIG. 5 is a schematic view in perspective and as an axial cross-section of an additional part that is part of the combustion chamber of FIG. 4.
Figure 6:
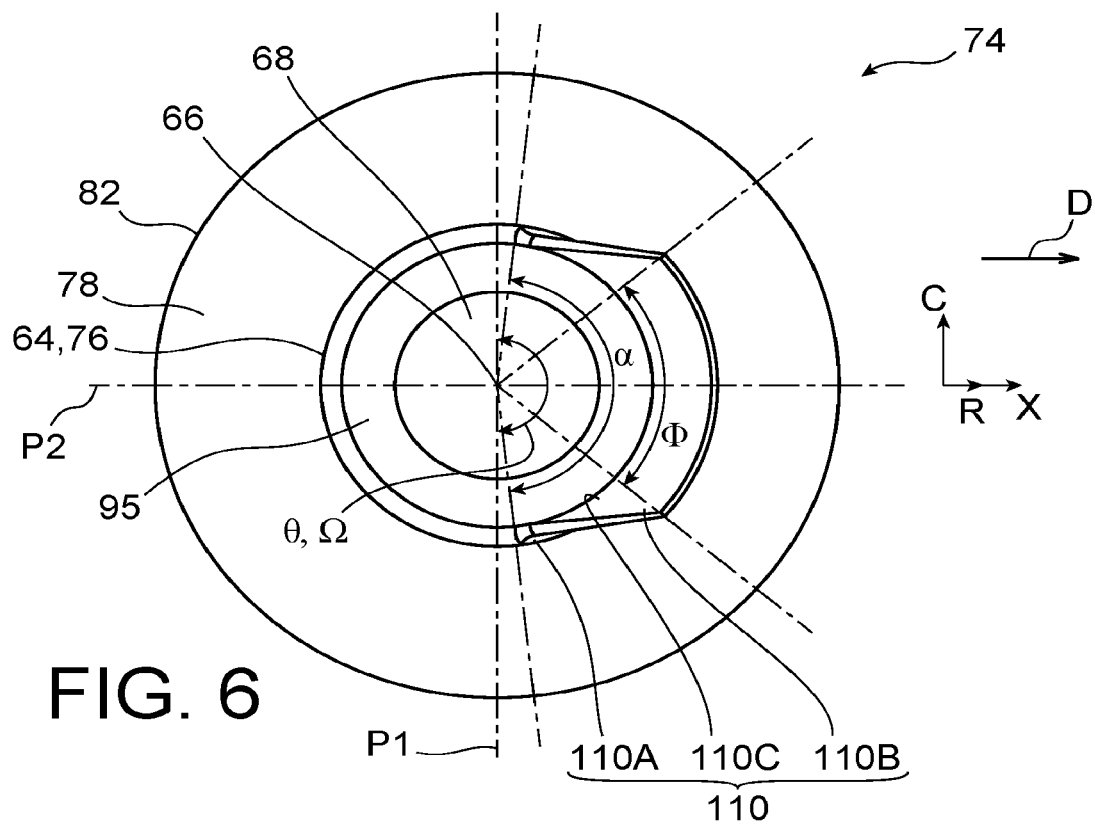
FIG. 6 is a schematic view of the bottom of the additional part of FIG. 5.
Figure 7:
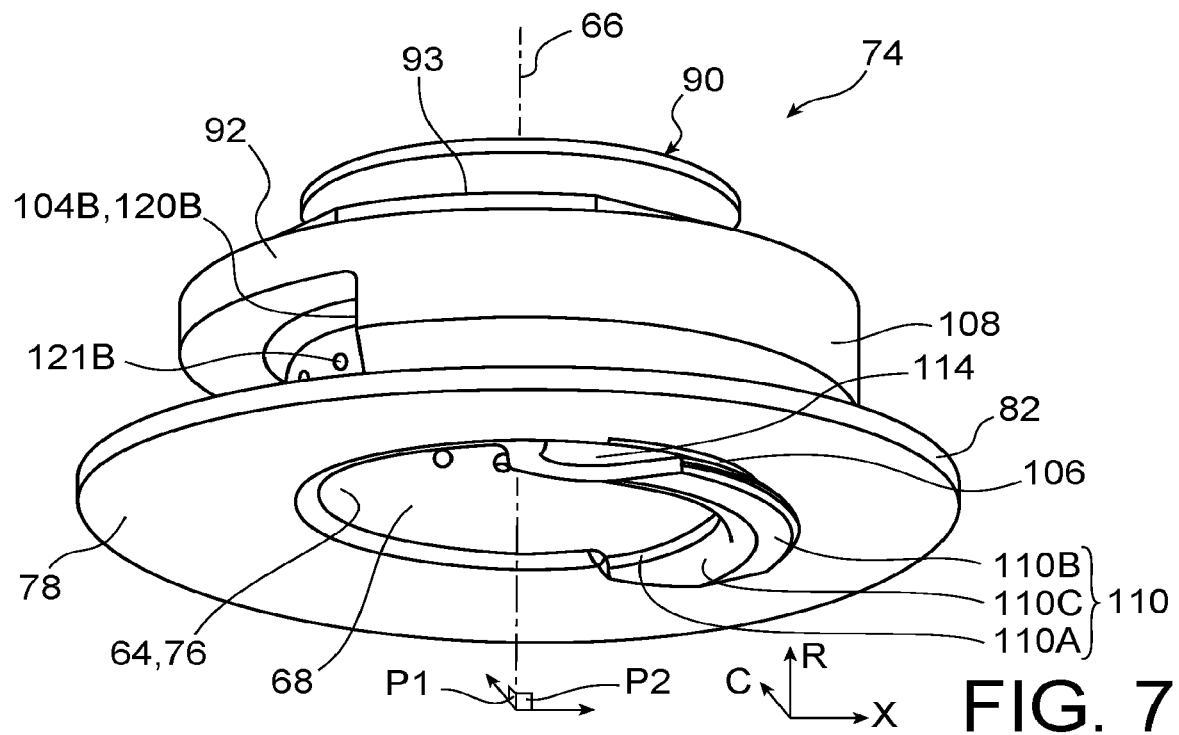
FIG. 7 is a schematic view in perspective of the additional part of FIG. 5.

In the example shown, the chimney 64 is formed in an additional part 74, shown alone in FIGS. 5-7.

This additional part comprises in particular a tubular wall 76 forming the chimney 64, and an annular flange 78 extending from the tubular wall 76 by moving away from the central axis 66, for example transversally to the tubular wall 76 (FIGS. 4-7).

The annular casing 32 is thus formed by an annular wall 80, and by the annular flange 78, through which the additional part 74 is fastened on the annular wall 80. This annular flange 78 has in particular a peripheral edge 82 connected to an inner edge 84 of an orifice of the annular wall 80 (FIG. 4).

The chimney 64 is advantageously provided with a bushing 90 (FIGS. 4 and 5) mounted floating in the chimney 64, for example in the radially external end of the latter, and intended to provide the contact with the spark plug by avoiding air leaks between the chimney 64 and the spark plug. For this purpose, the chimney 64 comprises for example a collar 92 arranged at the radially external end of the chimney and delimiting, for example with a washer 93, an annular groove 94 opening onto the central axis 66 of the chimney. In addition, the bushing 90 comprises an end flange 95 engaged in the annular groove 94 with a transversal play at the central axis 66. The additional part 74 further comprises a main air collection chamber 100 (FIGS. 4 and 5) arranged around a downstream portion 102A of the chimney 64 (FIG. 5) and configured to collect an incident flow of air F1 (FIG. 4) on the chimney 64 from upstream, and inject this air into the inner volume 47 of the combustion chamber in such a way that this air forms a parietal film F1 (FIG. 5) allowing for the cooling of the zone of the annular casing 32 located immediately downstream of the chimney 64 (i.e. the zone 73 located to the right of the wake 72, in reference to FIG. 3), as shall appear more clearly in what follows.

For this purpose, the main air collection chamber 100 is open to the upstream. The main air collection chamber 100 is for example in the form of a portion of a ring with two opposite respective circumferential ends 104A (FIG. 4) and 104B (FIG. 7) open to the upstream. The main air collection chamber 100 has an angle range, shown by the angle θ in FIG. 6, preferably comprised between 120 degrees and 240 degrees, with respect to the central axis 66 of the chimney. In the preferred example shown, this angle range is equal to 180 degrees, whereupon the respective circumferential ends 104A, 104B of the main air collection chamber 100 are diametrically opposite. The respective circumferential ends 104A, 104B are then defined in a plane P1 that includes the central axis 66 of the chimney and that is orthogonal to an axial plane P2 of the combustion chamber also comprising the central axis 66 of the chimney (the axial plane P2 corresponding to the plane of FIG. 2).

In addition, the annular flange 78 comprises at least one through-opening 106 (FIGS. 5 and 7) putting the inner volume 47 of the combustion chamber 18 (FIG. 4) and the main air collection chamber 100 (FIGS. 4 and 5) into direct communication. The through-opening 106 or each through-opening 106 is thus, more generally, formed in the annular casing 32.

In other words, the main air collection chamber 100 is delimited by a portion of the annular flange 78 comprising the through-opening 106 or each through-opening 106.

In the example shown, the annular flange 78 includes a single through-opening 106 taking the form of a curved slot around the central axis 66 of the chimney. As an alternative, the annular flange 78 can include a plurality over through-openings separated from one another, for example each one in the form of an orifice with a circular section.

The main air collection chamber 100 is furthermore delimited by a solid outer wall 108 (FIGS. 4, 5 and 7) extending facing and at a distance from the downstream portion 102A of the chimney 64 (FIGS. 4 and 5). This outer wall 108 thus closes the main air collection chamber 100 downstream.

In the example shown, the outer wall 108 connects the annular flange 78 to the collar 92, whereupon the main air collection chamber 100 extends to the collar 92. The main air collection chamber 100 is thus closed on the side opposite the annular casing 32, i.e. the radially external side. In the example shown, the closing of the main air collection chamber 100 of the side opposite the annular casing 32 is provided by the collar 92.

In the preferred embodiment of the invention, the additional part 74 further comprises a deflector 110 extending in the inner volume 47 of the combustion chamber (FIG. 4). More precisely, the deflector 110 extends facing the through-opening 106 and beyond the latter (FIG. 5), from a region 112 of the annular flange 78 (and therefore of the annular casing 32) that is closer to the central axis 66 of the chimney 64 than the through-opening is 106 (FIGS. 4 and 5). Thus, a space 114 of formation of parietal cooling air film (FIGS. 5 and 7), closed to the upstream and open to the downstream, is defined between the annular flange 78 (and therefore the annular casing 32) and the deflector 110.

The deflector 110 comprises a proximal portion 110A (FIGS. 5 and 7) in the form of a portion of a ring, through which the deflector 110 is connected to the region 112 of the annular flange 78 (or, more generally, of the annular casing 32), and a free distal portion 110B (FIGS. 5, 6 and 7) extending facing the through-opening 106 and beyond the latter.

In the preferred example shown, the free distal portion 110B extends substantially parallel to the annular flange 78 (and therefore to the annular casing 32). More generally, the free distal portion 110B advantageously forms an angle less than 30 degrees with the annular casing 32, in a cross-section view along the axial plane P2.

In addition, in the preferred example shown, the deflector 110 comprises a median portion 110C curved downstream, that connects the free distal portion 110B to the proximal portion 110A of the deflector.

The proximal portion 110A of the deflector has an angle range a with respect to the central axis 66 which is preferably less than or equal to 180 degrees (FIG. 6).

In the example shown, the through-opening 106 has an angle range, defined with respect to the central axis 66, which is less than that of the proximal portion 110A of the deflector, as is shown in FIG. 7. This makes it possible to maximise the proportion of the air, coming from the through-opening 106, that is deviated downstream by the deflector 110.

The free distal portion 110B of the deflector 110 has for example a free end of which the angle range ϕ, defined with respect to the central axis 66, is less than the angle range a of the proximal portion 110A (FIG. 6).

Thus, the free distal portion 110B of the deflector 110 is essentially arranged facing the zone of the annular casing 32 located downstream of the chimney 64 (i.e. the zone 73 located to the right of the wake 72, visible in FIG. 2), which makes it possible to maximise the cooling of this zone by the parietal cooling film of air formed in the space 114.

In the embodiment shown, the additional part 74 further comprises a secondary air collection chamber 120 arranged facing the downstream portion 102A of the chimney 64 (FIGS. 4 and 5) and configured to collect an incident air flow F3 (FIG. 4) on the chimney 64 from upstream. In addition, the downstream portion 102A of the chimney 64 comprises air passage orifices 121A (FIG. 4) putting into direct communication the passage 68, delimited by the chimney, and the secondary air collection chamber 120, in order to allow air coming from the secondary air collection chamber 120 to penetrate into the passage 68 (FIG. 5: F4) and to thus cool a downstream side 122A of the spark plug (FIGS. 2 and 3).

So as to be supplied with air, the secondary air collection chamber 120 is open to the upstream. For this purpose, the secondary air collection chamber 120 is for example in the form of a portion of a ring with two opposite respective circumferential ends 120A, 120B open to the upstream (FIGS. 4 and 5).

The respective circumferential ends 120A, 120B of the secondary air collection chamber 120 are advantageously in the same plane as the respective circumferential ends 104A, 104B of the main air collection chamber 100, and are therefore also diametrically opposite.

In the example shown, the two respective circumferential ends 120A, 120B of the secondary air collection chamber 120 are therefore defined in the plane P1.

In alternative embodiments, the respective circumferential ends 120A, 120B of the secondary air collection chamber 120 are offset upstream outside the main air collection chamber 100.

In other alternative embodiments, the respective circumferential ends 120A, 120B of the secondary air collection chamber 120 are offset downstream inside the main air collection chamber 100.

More generally, the secondary air collection chamber 120 preferably has an angle range, shown by the angle Ω in FIG. 6, comprised between 120 degrees and 240 degrees with respect to the central axis 66 of the chimney.

The secondary air collection chamber 120 is arranged between the chimney 64 and a portion of the main air collection chamber 100.

More precisely, in reference to FIGS. 4 and 5, the main air collection chamber 100 comprises an inner portion 100i extending from the outer wall 108 to the tubular wall 76 (or, more generally, to the chimney 64) and delimited by the annular flange 78 (or, more generally, by the annular casing 32), and an outer portion 100e extending from the outer wall 108 to a partition 124, and delimited by the collar 92. The cloison 124 is arranged between the outer wall 108 and the chimney 64, and the secondary air collection chamber 120 is formed between the chimney 64 and the partition 124. The partition 124 thus closes the secondary air collection chamber 120 downstream.

For example, the partition 124 comprises an outer portion 124e extending coaxially to the tubular wall 76 in the direction of the annular flange 78 from the collar 92, and an inner portion 124i connecting the outer portion to the tubular wall 76.

This particular arrangement allows the through-opening 106 to be arranged as close as possible to the chimney 64, to the right of the secondary air collection chamber 120 in the direction of the central axis 66 of the chimney, which makes it possible to prevent the existence of a non-cooled region of the annular casing 32 immediately downstream of the chimney 64.

Moreover, the chimney 64 comprises for example other air passage orifices 121B, formed in an upstream portion 102B of the chimney 64 (FIGS. 4-6), defined outside the angle θ and the angle Ω of FIG. 6, i.e. upstream of the region of the chimney 64 located facing main 100 and secondary 120 air collection chambers. These orifices 121B thus allow for the cooling of an upstream side 122b of the spark plug (FIG. 3) by incident air on the upstream portion 102B of the chimney 64. In the example shown, the orifices 121A and the other orifices 121B together form an annular row of orifices regularly distributed around the central axis 66.

In operation, the relatively cool flow of air F1 coming from upstream (FIG. 4) is captured by the respective circumferential ends 104A, 104B of the main air collection chamber 100 and bypasses the chimney 64 by circulating within this main air collection chamber 100 then escapes from the latter through the through-opening 106, through which the air penetrates into the space 114. The air is then deviated downstream by the deflector 110 whereupon the air forms a parietal cooling film of air F2 (FIG. 5) circulating downstream along the inner face of the annular casing 32. The air thus makes it possible to efficiently cool the zone of the annular casing 32 located immediately downstream of the chimney 64 (i.e. the zone 73 located to the right of the wake 72).

Moreover, the relatively cool flow of air F3 coming from upstream (FIG. 4) is captured by the respective circumferential ends 120A, 120B of the secondary air collection chamber 120 and bypasses the chimney 64 by circulating within this secondary air collection chamber 120 then penetrates into the passage 68 via the air passage orifices 121A. The centripetal flow of air F4 coming from these orifices (FIG. 5) allows for the cooling of the downstream side 122A of the spark plug (FIGS. 2 and 3).

The separation of the flow of air F1 and F3 by the partition 124 makes it possible to ensure a homogeneous supply of the air passage orifices 121A while still controlling the flow rate of the flow of air F1 intended for forming the parietal cooling film of air F2.

As an alternative, the annular wall 80 and the elements described hereinabove as belonging to the additional part 74 can be carried out in a single piece. These elements are in particular the chimney 64, the annular flange 78, the main air collection chamber 100, and, where applicable, the deflector 110, and the secondary air collection chamber 120.

Moreover, the configuration described hereinabove in relation with the external annular casing 32 exteriorly delimiting the inner volume 47 of the combustion chamber can, as an alternative or in a complementary manner, be applied to the cooling of the inner casing 30 that interiorly delimits this inner volume 47.

Similarly, in the cases where the annular casing of a chamber bottom 38 comprises radial ends curved downstream, the additional part 74 can be added in an orifice of this annular casing of a chamber bottom 38, or, as an alternative, the elements described hereinabove as belonging to the additional part 74 can be integrated into this annular casing of a chamber bottom 38.

In the embodiment shown, the main air collection chamber 100 and the through-opening 106 are centred with respect to the axial plane P2. The same applies with regards to the deflector 110 and the secondary air collection chamber 120.

Such a configuration is optimal in the case where the flow of air 44 coming from a diffuser 46 is an axial air flow, i.e. devoid of a gyratory component, whereupon the wake 72 is centred with respect to the axial plane P2.

As an alternative, in the case where the air flow 44 has a gyratory component at the outlet of the diffuser 46, whereupon the wake 72 is inclined with respect to the axial plane P2, the main air collection chamber 100, the through-opening 106 and, where applicable, the deflector 110, the space 114 of formation of parietal cooling air film, and the secondary air collection chamber 120, can be centred with respect to a plane inclined with respect to the axial plane P2 and comprising the central axis 66 of the chimney 64. The flow of the flow of air 44 being in this case locally inclined in relation to the axial direction X, the qualifiers "upstream" and "downstream", applied to the definition of the air collection chamber 100 and, where applicable, the space 114 of formation of parietal cooling air film, and the secondary air collection chamber 120, are defined by reference to the local inclined direction of the flow of the flow of air 44.

In the foregoing, the expression "comprising one" must be understood as being a synonym of "comprising at least one", except if the contrary is specified.

The invention claimed is:

1. A combustion chamber for a turbomachine, comprising:
    a longitudinal axis;
    an annular casing delimiting an inner volume of the combustion chamber and provided with a chimney extending radially outward relative to the longitudinal axis, to an outside of the inner volume and delimiting a passage for a penetrating part through the annular casing, the chimney having a central axis, and a bushing mounted floating on the chimney;
    a main air collection chamber, open on an upstream end thereof and closed on a downstream end thereof in a direction of flow of gases in the turbomachine, arranged radially facing a downstream portion of the chimney relative to the central axis; and
    at least one through-opening formed in a portion of the annular casing delimiting a radially inward end of the main air collection chamber relative to the longitudinal axis so as to put into direct communication the inner volume of the combustion chamber and the main air collection chamber,
    wherein a radially outward end of the main air collection chamber relative to the longitudinal axis is closed by a collar extending radially outward relative to the central axis from the chimney, and
    wherein the downstream end of the main air collection chamber is closed by an outer wall that extends at a distance from and radially faces the downstream portion of the chimney relative to the central axis, the outer wall connecting the annular casing to the collar.

2. The combustion chamber according to claim 1, further comprising a deflector arranged in the inner volume of the combustion chamber, connected to a region of the annular casing that is closer to the central axis of the chimney than the at least one through-opening, the deflector extending beyond and facing the at least one through-opening, whereupon a space of formation of parietal cooling air film, closed on an upstream end thereof and open on a downstream end thereof, is defined between the annular casing and the deflector.

3. The combustion chamber according to claim 2, wherein the deflector comprises a proximal portion in the form of a ring portion through which the deflector is connected to said region of the annular casing, and a free distal portion extending facing and beyond the at least one through-opening.

4. The combustion chamber according to claim 1, wherein the main air collection chamber is in the form of a ring portion and has two opposite respective circumferential ends open on the upstream end thereof.

5. The combustion chamber according to claim 1, wherein the main air collection chamber is closed on the side opposite the annular casing.

6. The combustion chamber according to claim 1, further comprising a secondary air collection chamber, open on an upstream end thereof and closed on a downstream end thereof, arranged facing the downstream portion of the chimney, and wherein the downstream portion of the chimney comprises air passage orifices putting into direct communication the passage and the secondary air collection chamber.

7. The combustion chamber according to claim 6, wherein the secondary air collection chamber is in the form of a portion of a ring and has two opposite respective circumferential ends open on the upstream end thereof.

8. The combustion chamber according to claim 6, wherein the secondary air collection chamber is arranged between the chimney and a portion at least of the main air collection chamber.

9. The combustion chamber according to claim 1, wherein the annular casing is formed at least by:
- an annular wall provided with an orifice, and
- an annular flange of an additional part, housed in the orifice of the annular wall, and wherein the additional part further comprises at least:
- a tubular wall forming the chimney, and from which the annular flange extends further away from the central axis of the chimney, said annular flange comprising the at least one through-opening, and
- the main air collection chamber.

10. The combustion chamber according to claim 9, further comprising a deflector arranged in the inner volume of the combustion chamber, connected to a region of the annular casing that is closer to the central axis of the chimney than the at least one through-opening, the deflector extending beyond and facing the at least one through-opening, whereupon a space of formation of parietal cooling air film, closed on an upstream end thereof and open on a downstream end thereof, is defined between the annular casing and the deflector,
- wherein the deflector comprises a proximal portion in the form of a ring portion through which the deflector is connected to said region of the annular casing, and a free distal portion extending beyond and facing the at least one through-opening,
- wherein the additional part further comprises said region of the annular casing to which the deflector is connected, and the deflector.

11. The combustion chamber according to claim 9, further comprising a secondary air collection chamber, open on an upstream end thereof and closed on a downstream end thereof, arranged facing the downstream portion of the chimney, and wherein the downstream portion of the chimney comprises air passage orifices putting into direct communication the passage and the secondary air collection chamber,
- wherein the additional part further comprises the secondary air collection chamber.

12. A turbomachine for an aircraft, comprising a combustion chamber according to claim 1, and a penetrating part extending through the chimney.

13. The turbomachine according to claim 12, wherein the penetrating part is a spark plug.

* * * * *